Dec. 27, 1949  R. E. HERR ET AL  2,492,747
COOLED ELECTRICAL APPARATUS
Filed June 22, 1945
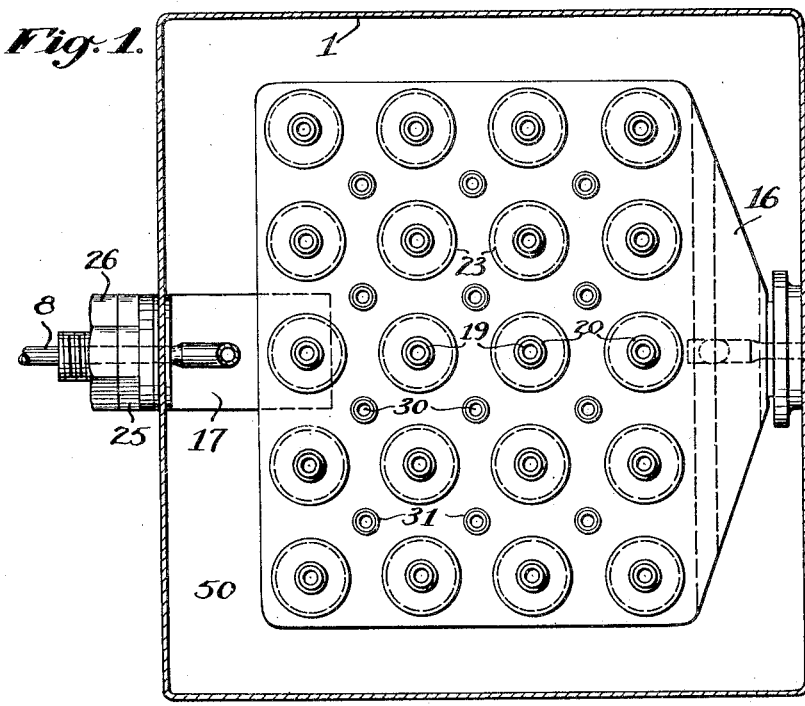
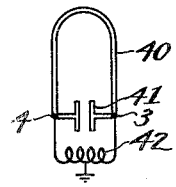
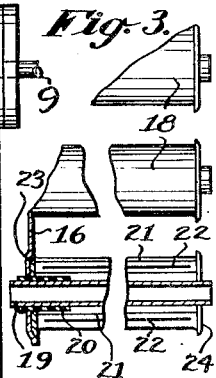
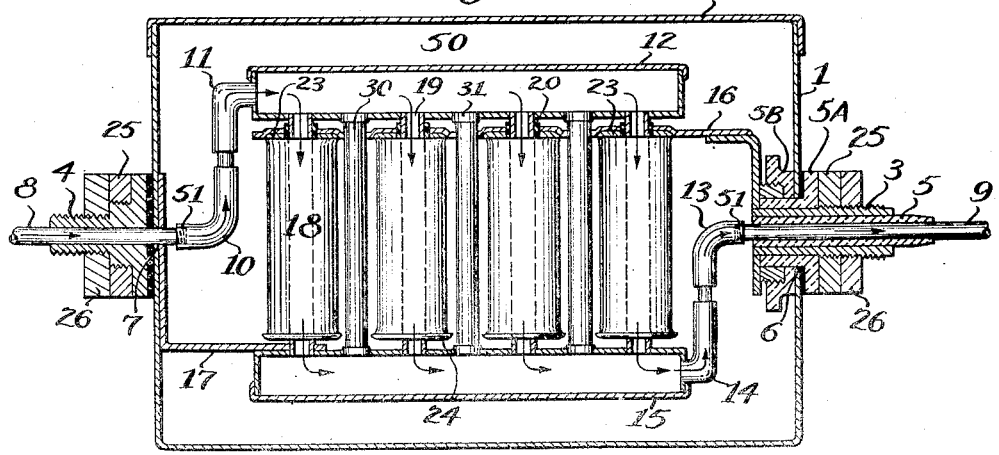
INVENTORS.
RUSSELL E. HERR
LANNES E. ANDERSON
BY H. S. Grover
ATTORNEY Patented Dec. 27, 1949

2,492,747

UNITED STATES PATENT OFFICE 2,492,747

COOLED ELECTRICAL APPARATUS

Russell E. Herr, Mount Ephraim, and Lannes E. Anderson, Collingswood, N. J., assignors to Radio Corporation of America, a corporation of Delaware Application June 22, 1945, Serial No. 600,860

2 Claims. (Cl. 174—15)

This invention relates to a new and useful electric condenser which is particularly adapted for carrying high current such as is encountered in industrial electric welding employing radio frequencies in a range from 400 kilocycles to 1000 kilocycles.

An object of this invention is to provide an improved high current capacity condenser in which the capacitive elements are cooled by a circulating cooling fluid.

Another object of this invention is the use of a rolled condenser having a cooling reservoir located at each one of the ends of the condenser rolls, with fluid cooling tubes within and outside the condenser units.

A feature of this invention is the novel arrangement of the capacitive units within a metallic casing, the units being interposed between two fluid reservoirs through which cooling fluid passes from one end of the condenser to another.

Although electric condensers having fluid cooling means are old in the art, they are unable to stand the excessive heating which is encountered in high frequency electric welding. By the improved cooling method of this invention and by the use of an improved dielectric material for the condenser units, a device has been devised which will overcome the objections of the prior art. The condenser of this invention is capable of operating continuously in radio frequency electric welding circuits having 1,000 volts and carrying 1,000 amperes.

This invention will best be understood by referring to the accompanying drawing in which:

Fig. 1 is a plan view of the condenser of this invention.

Fig. 2 is a longitudinal section of Fig. 1,

Fig. 3 is a cross section of Fig. 1 shown partly in elevation, and

Fig. 4 is a radio frequency circuit showing a use of the condenser of this invention.

Referring now in detail to the drawing, a metallic casing 1 having a cover 2 arranged to enclose a plurality of condenser units. The side walls of casing 1 support two high current welding terminals 3 and 4 which are located in the central portion and extend outward from the ends of the casing. A cooling fluid of oil 50 is placed within casing 1. The terminal 3 is composed of a metallic tube which is provided with insulating bushings 5A and 5B, each one of the insulating bushings 5A and 5B being arranged concentric with the metallic terminal tube 3 which is insulatingly secured to casing 1 by passing over the insulating bushing 5 and then through bushing 5A, the latter bushing is secured to the central portion of casing 1 by passing through an aperture 6. The bushing 5B then clamps bushing 5A to the side of the casing 1. The terminal 4 includes a metal bushing surrounding an inlet conduit 8 which conduit passes through an aperture 7 in casing 1. An outlet fluid conduit 9 passes in through the central portion of insulating bushing 5. The portion of conduit 8 within casing 1 is provided with two threaded elbows 10 and 11 which support one end of a metallic reservoir 12, for example, made of copper. The portion of conduit 9 which is inside the casing is also provided with two elbows 13 and 14 which terminate in a second or lower reservoir 15. Inlet conduit 8 and outlet 9 are both threaded at 51 to permit assembly within casing 1. A radiating and terminal conductor plate 16 is spaced directly beneath the upper reservoir 12 and is insulated therefrom. A second radiating and terminal plate 17 is placed in thermal and electrical contact with the lower reservoir 15, which plate also serves as a support. Interposed between conducting plate 16 and the lower reservoir 15 there are arranged a plurality of rolled condenser units 18. The condenser units 18 are especially constructed as shown in detail by Fig. 3. A metallic tube 19 forms both a cooling tube and a winding mandrel for the condenser unit. In order to prevent short circuiting of the condenser layers, the upper end of tube 19 is partly covered with an insulating tube 20. Where cooling conditions will permit, tube 19 may be of glass with a silver plated band at each end. The plated band of tube 19 is then soldered directly to each one of the reservoirs and the insulating tube 20 can then be omitted. Upon the tube 19 are wound two layers of a dielectric material 22, which are preferably of polystyrene ribbon, and then two layers of metallic foil such as, for example, lead foil 21. The dielectric material 22 insulates each metallic foil by being interposed therebetween. One end of each strip of the lead foils 21 is arranged to extend alternately beyond the dielectric ribbons 22, and for making electrical connection thereto, metallic cup-shaped discs 23 and 24 are located at the condenser rolled ends. The rim of discs 23 are soldered to the projecting metallic foils of the condenser. The foils and polystyrene ribbons are wound with a plurality of turns, sufficient to give a desired capacity. As will be seen in Fig. 1, there are four rows of condenser units placed along one direction of the casing and five rows in the other direction, thus making the total of twenty condenser units connected in parallel. The capacity of each unit is .02 microfarad and when twenty units are used, the capacity will be .4 microfarad total. A larger or smaller amount may be employed to give a different value of capacity. The top end caps 23 are all soldered to plate 16, which has a corresponding number of holes to receive the insulating tubes 20 which project sufficiently beyond the surface of plate 16 to provide the proper insulation for 1000 volts. The metallic tube 19 continues beyond the disc 23 and is placed in fluid communication with the upper reservoir 12, the tube 19 being soldered to the bottom of reservoir 12 to prevent leakage of the fluid. The end discs 24 are spaced slightly above reservoir 15 and at this end, only the metal tube 19 of each unit projects therethrough, the tubes being soldered to the upper portion of the reservoir 15 in a manner similar to that mentioned above, in order to prevent leakage of the fluid. A plurality of glass cooling tubes 30 with silver plated end bands are arranged to extend from one reservoir to another. The tubes 30 are spaced between the condenser units to aid in cooling the outside of the rolls. A band of silver plating 31 at each end of the tube 30 is provided to solder the tubes to the reservoirs.

In assembling the device of this invention, the two reservoirs 12 and 15 are first connected to conduits 8 and 9 by means of elbows 10 and 11, 13 and 14. The plate 16 is then assembled with the insulating bushing 5, 5A, 5B and metallic bushing 3, this arrangement being such as to insulate one portion of the condenser from that of the casing and upper reservoir 12. The plate 17 is then placed in position by being bent up and placed along side of bushing 4 and electrically connected thereto. The entire unit is then assembled with the condenser units and glass tubes 30 in their proper positions, as shown by the drawings. The entire unit is then placed within a metal casing 1 and the casing is filled with a high grade of insulating oil which provides suitable electric insulation and also assists in the cooling of the condenser unit. The terminal bushings 3 and 4 of sufficient size to carry a thousand amperes or more, and arranged to connect with the electrodes of the welding machine by having the terminals clamped between clamp nuts 25 and lock nuts 26.

Fig. 4 shows the circuit arrangement wherein a work coil 40 is connected to the condenser 41 of this invention. An oscillator inductance coil 42 connects to condenser 41 of a tank circuit. Coil 40 is cooled by the same fluid source as condenser 41.

This invention should not be limited to the precise arrangement shown.

What is claimed is:

1. A fluid cooling system for electrical apparatus comprising a casing for enclosing said electrical apparatus, a first fluid reservoir, a second fluid reservoir, an electrical terminal plate interposed between said reservoirs, a plurality of electrical devices each one of which is interposed between said terminal plate and said second reservoir, and fluid cooling means passing through a hollow core in said electrical devices and in fluid communication between said first and second reservoirs for cooling said devices, a metallic bushing located in said casing for supporting said terminal plate from said casing, and an inlet and an outlet tube insulatingly passing through the walls of said casing, said outlet tube passing through said metallic bushing, said inlet and outlet tubes connecting said first and second fluid reservoirs with an outside fluid supply source to form a circulating fluid path from one reservoir through the hollow core to the other reservoir to cool said electrical devices.

2. A fluid cooling system for electrical apparatus comprising a metallic casing containing an insulating oil, a pair of parallelly arranged reservoirs within said casing, an electrical terminal plate interposed between said reservoirs, a plurality of electrical devices interposed between said terminal plate and one of said reservoirs, fluid cooling means in fluid communication between said parallelly arranged reservoirs including a plurality of tubes some of which pass through each one of said electrical devices, others of said tubes being arranged outside of said electrical devices, a fluid inlet connected to one of said reservoirs and passing through the wall of said casing to permit cooling fluid to flow from one reservoir to the other reservoir through all of said tubes, and a fluid outlet tube insulatingly passing through the wall of said casing and in fluid communication with the other of said reservoirs.

RUSSELL E. HERR.
LANNES E. ANDERSON.

REFERENCES CITED

The following references are of record in the file of this patent:

UNITED STATES PATENTS

| Number | Name | Date |
|---|---|---|
| Re. 15,642 | Smith | July 3, 1923 |
| 1,536,948 | Thomson | May 5, 1925 |
| 1,580,873 | Weldon | Apr. 13, 1926 |
| 1,942,153 | Seeley | Jan. 2, 1934 |
| 1,991,707 | Silbermann | Feb. 19, 1935 |
| 2,050,587 | Ruben | Aug. 11, 1936 |
| 2,098,746 | Hansson | Nov. 9, 1937 |
| 2,177,266 | Schupp | Oct. 24, 1939 |
| 2,256,757 | Durand | Sept. 23, 1941 |
| 2,306,527 | Daniels | Dec. 29, 1942 |
| 2,326,151 | Marbury | Aug. 10, 1943 |
| 2,359,174 | Vogel | Sept. 26, 1944 |
| 2,403,969 | Fledel-Beck | July 16, 1946 |

FOREIGN PATENTS

| Number | Country | Date |
|---|---|---|
| 218,588 | Switzerland | Apr. 1, 1942 |
| 335,829 | Great Britain | Oct. 2, 1930 |
| 378,656 | Great Britain | Aug. 18, 1932 |